W. H. DOBLE.
PACKAGE FILLING MACHINE.
APPLICATION FILED JAN. 7, 1907.

923,779.

Patented June 1, 1909.
3 SHEETS—SHEET 3.

Witnesses.
William S. Scales
Alice H. Morrison

Inventor:
William H. Doble
by Macleod, Calver, Copeland & Dike
attorneys.

UNITED STATES PATENT OFFICE.

WILLIAM H. DOBLE, OF QUINCY, MASSACHUSETTS.

PACKAGE-FILLING MACHINE.

No. 923,779.  Specification of Letters Patent.  Patented June 1, 1909.

Application filed January 7, 1907. Serial No. 351,116.

*To all whom it may concern:*

Be it known that I, WILLIAM H. DOBLE, citizen of the United States, residing at Quincy, in the county of Norfolk and Commonwealth of Massachusetts, have invented a certain new and useful Improvement in Package-Filling Machines, of which the following is a specification, reference being had therein to the accompanying drawings.

The object of the invention is to provide a package filling machine having mechanism whereby a uniform quantity of material may be supplied to each package during predetermined periods of time independent of either weighing or measuring devices. Also to provide means whereby a continuous feed may be shifted from one package to another at predetermined uniform intervals of time independent of the weight or measure of the material.

In carrying out my invention I provide a hopper from which the goods are fed through a funnel or supply chute having two discharge outlets and a cut-off arrangement which is adapted to alternately close first one and then the other of the two discharge outlets, one of the discharge outlets being open while the other is closed, mechanism for shifting the cut-off at predetermined intervals of time, and mechanism for continuously feeding the material so that the instant it is shut off from the discharge outlet, it will be shifted to the other discharge outlet.

Other features of the invention will be set forth in the accompanying specification.

The invention will be fully understood from the following description taken in connection with the accompanying drawings, and the novel features thereof are pointed out and clearly defined in the claims at the close of the specification.

Figures 1, 8:
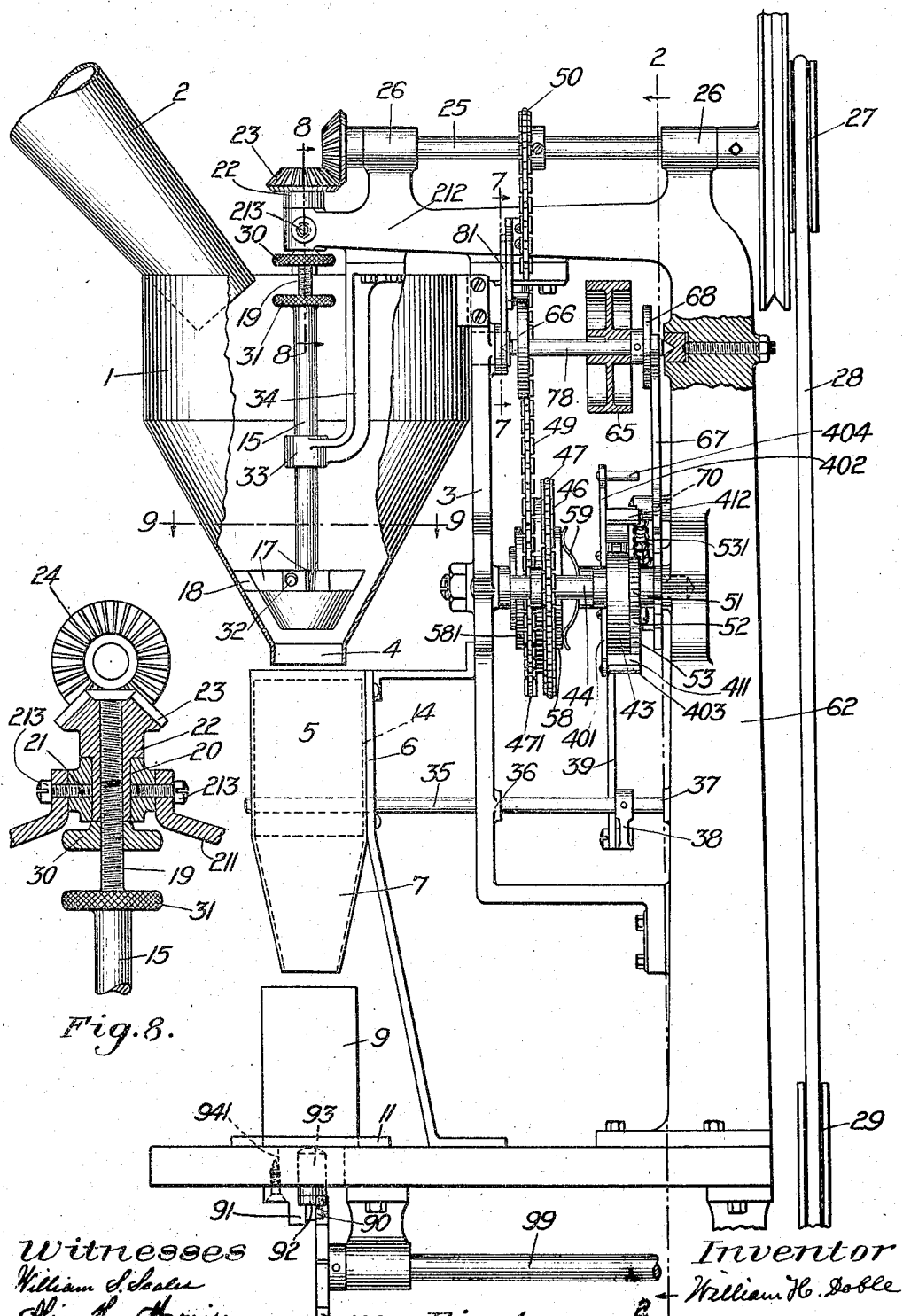
Figure 2:
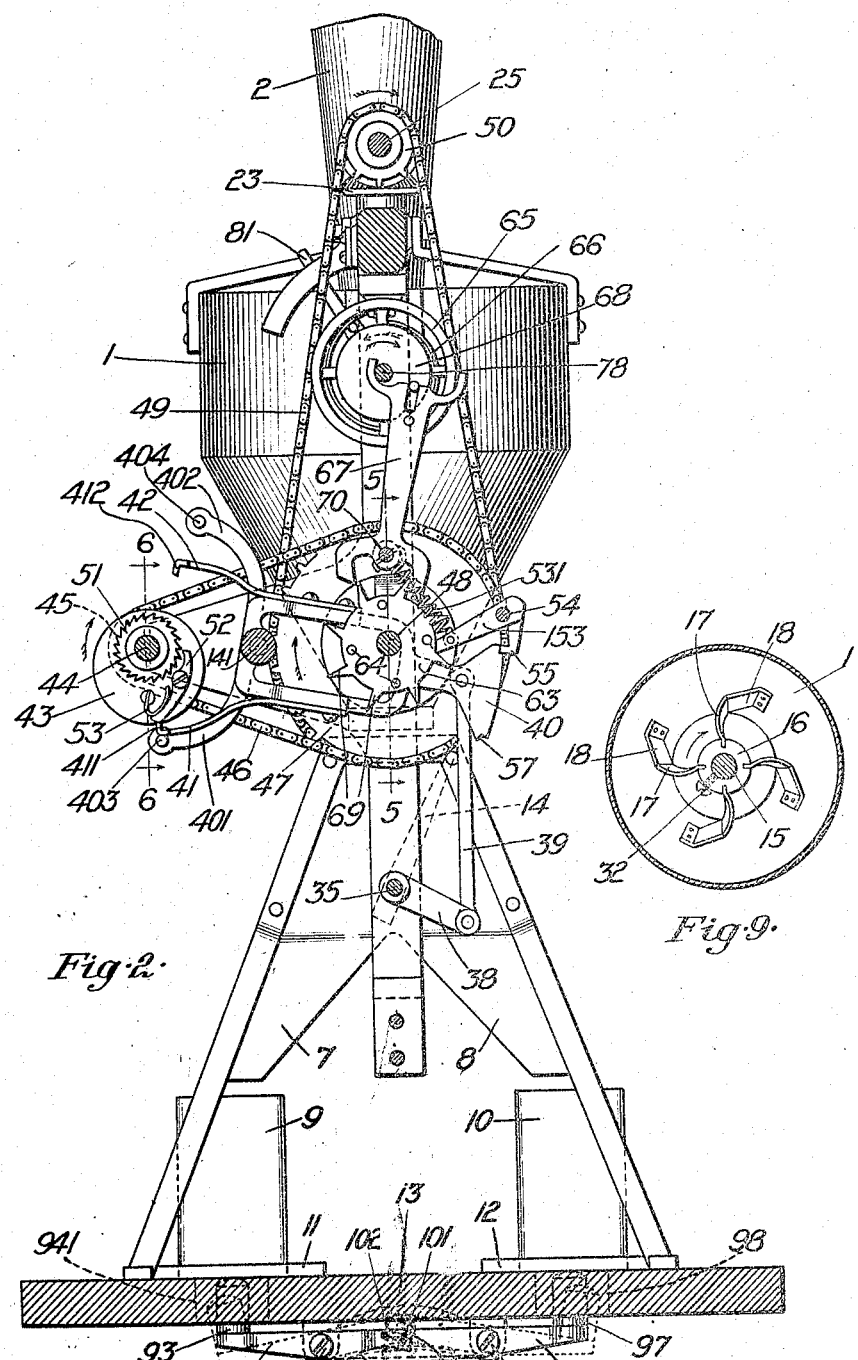
Figure 3:
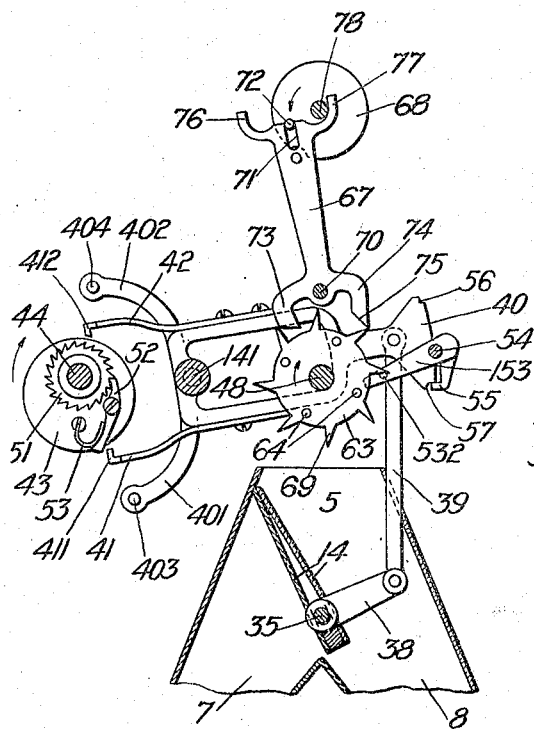
Figure 4:
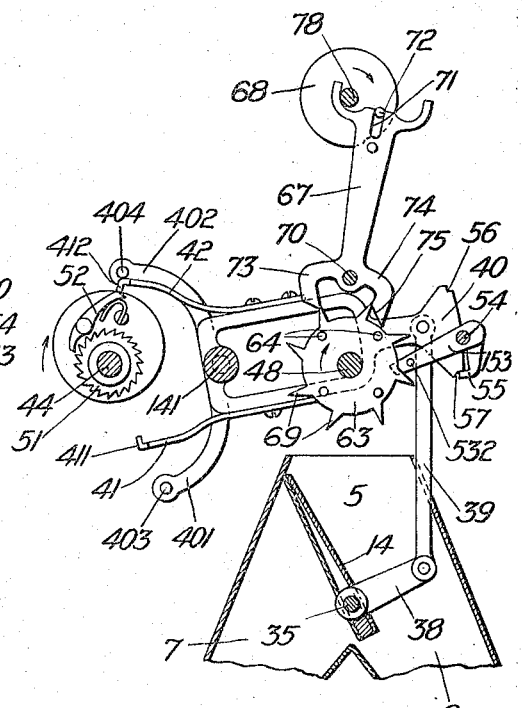
Figure 5:
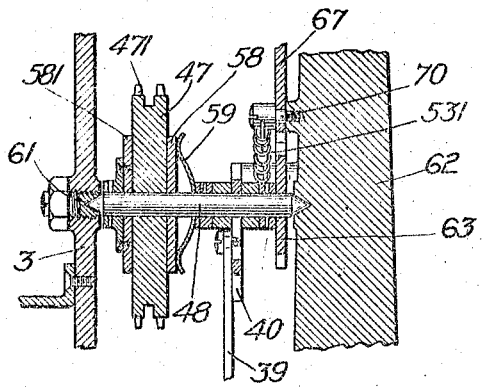
Figure 6:
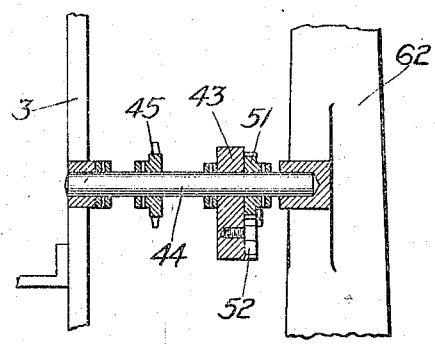
Figure 7:
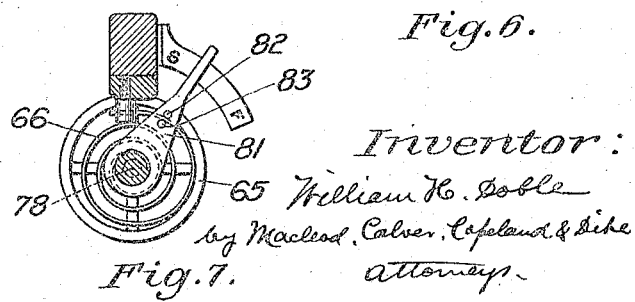

In the drawings,—Figure 1 is a side elevation of a machine embodying my invention. Fig. 2 is a rear elevation sectioned on line 2—2 of Fig. 1 and looking to the left as indicated by the arrows, the standard being cut away to more clearly show the mechanism. Fig. 3 is a detail of the deflector moving lever and its actuating mechanism; also the escapement and actuating parts in the position which they occupy just after the deflector has been shifted. The deflector will remain in this position until the cam which actuates the deflector moving lever has made a half revolution and the escapement has again tripped the latch which locks the shifting lever. Fig. 4 is a detail of the same parts as shown in Fig. 3, showing the cam which actuates the deflector moving lever at the completion of a half revolution after it has left the position shown in Fig. 3 and showing the spring on the deflector flexed and the pawl thrown out of the ratchet while the latch is not yet tripped; also showing the pallets and escapement in the opposite position from that shown in Fig. 3, the tooth of the escapement having just engaged with the working face of the pallet ready to move the escapement lever at the next onward movement of the escape wheel. Fig. 5 is a section on line 5—5 of Fig. 2 enlarged. Fig. 6 is a section on line 6—6 of Fig. 2 enlarged. Fig. 7 is a detail of the balance wheel and its regulating mechanism section on line 7—7 of Fig. 1. Fig. 8 is a sectional detail enlarged on line 8—8 of Fig. 1 showing the stirrer and the adjusting mechanism to raise and lower the stirrer. Fig. 9 is a section on line 9—9 of Fig. 1 showing the stirrer.

Referring now to the drawings,—1 represents a hopper and 2 a supply chute through which the material may be fed in any suitable way to the hopper. The hopper 1 is suitably supported on the frame or standard of the machine, being shown in the drawings as secured to the bracket 3 which forms a part of the frame. The hopper 1 tapers downwardly, and its lower end is provided with a discharge outlet 4. Stirrer mechanism is provided within the hopper as will be more particularly hereinafter described for the purpose of causing a continuous and uniform feed.

Beneath the discharge outlet of the hopper is mounted a funnel 5 into which the material falls from the discharge outlet of the hopper 1. This funnel 5 is mounted on suitable supports, being shown herein as secured to a standard 6 which forms a part of the frame of the machine. The funnel 5 branches in its lower portion into two passages 7, 8, which are adapted to discharge respectively into the cans or other receptacles 9, 10, which are stationed respectively on the holders 11, 12, mounted on the base 13 of the machine.

A movable baffle plate or deflector 14 is provided in the body of the funnel 5 above the entrances to the branch passages 7, 8, which is adapted to alternately close the entrance to said passages 7, 8. The mechanism for actuating the deflector will be hereinafter more fully described.

In order to have the material pass out of the hopper 1 to the funnel with a uniform flow, it is desirable to have a feed device located in the lower part of the hopper. There is a tendency for the material to gather in bunches more or less, according to the nature of the material, and it is, therefore, desirable to have mechanism for breaking up these masses or for separating small portions at a time from the general mass in the hopper. For some kinds of goods, it is best to separate the portions which are to be fed in the form of thin films from the main bulk, and to make a somewhat restricted passage out of the hopper.

The feed mechanism which is illustrated in the accompanying drawings is as follows. Extending down into the lower part of the hopper is a vertical rotary shaft 15 having secured to a collar 16 on the lower end of the shaft a series of radiating stirrer blades 17, (see Fig. 9), which preferably are curved and slightly inclined with relation to the direction of rotation as shown in Fig. 9, so that as the stirrer shaft 15 rotates, the blades 17 will have a sort of lifting action. These radiating blades extend only a portion of the radius of the hopper.

Secured to the inner sides of the inclined portion of the hopper are a series of inwardly extending blades 18. These fixed blades 18 are preferably so arranged that the inner ends will extend very nearly or quite to the circular path described by the inner ends of the rotating blades, but are preferably arranged at an angle to the path as shown in Fig. 9 rather than radial thereto. The rotating blades 17 gather a cylindrical mass of the material which the rapid rotation of the shaft tends to keep in revolution, but each time it passes one of the blades 18, a thin film is shaved therefrom and caused to drop down between the blades and pass into the funnel beneath, and this flow will be at a substantially uniform rate for any given adjustment and speed of rotation.

The mechanism for supporting and rotating the shaft 15 is as follows: The upper end of the shaft 15 is formed with a threaded stem 19 which screws into a tapped out rotary sleeve 20 which has its bearings in a box 21 which is fixedly secured within a tubular boss 211 of the arm 212 of the standard by means of set screws 213. The shaft 15 also passes through a tubular boss 33 on the bracket 34 attached to the frame of the machine as an additional bearing to steady the shaft. The sleeve 20 has an enlarged upper portion 22 forming a shoulder which rests upon the upper end of the bearing 21 which supports it. The upper end of the sleeve 20 is formed with a bevel gear 23 which meshes with a bevel gear 24 mounted on the end of the driving shaft 25 which is journaled in bearings 26 of the frame and is driven in any suitable manner. As shown in the drawings, the driving shaft is provided with a pulley 27 over which a belt 28 runs to a driving pulley 29 which may be driven by any suitable power.

It is desirable to be able to adjust the blades 17 vertically so as to increase or diminish the annular space between the blades and sides of the hopper, in order to thereby increase or diminish the open portion of the passage to the outlet, thereby varying the quantity of goods allowed to pass out in a given time. In order to accomplish this, the preferred method of construction is to make the shaft 15 vertically adjustable, although it is obvious that it might be accomplished by making the blades 17 vertically adjustable in the collar 16 or make the collar 16 vertically adjustable on the shaft. As shown in the drawings, the shaft is made vertically adjustable by means of the threaded shank 19 which screws into the sleeve 20, as already described. If it is desired to elevate the shaft 15 from the position as shown in Fig. 8, the check nut 30 will be turned down and the shaft 15 can then be turned by means of the milled finger piece 31 until the shaft is adjusted to the desired elevation. Then the check nut 30 is set up again against the lower end of the sleeve 20 to bind the shaft in its adjusted position. If it is desired to adjust the blades on the shaft, this may be done by loosening the set screw 32 and sliding the collar 16 up or down on the shaft to the desired position and then setting up the screw 32.

It is preferable that the free ends of the fixed blades 18 shall be slightly beveled to form a cutting edge, the better to adapt them for shaving off a thin film of material from the rotating cylindrical mass of material.

Mounted on a rockershaft 35, which passes through the funnel 5, above the point where the funnel branches into the two passages 7, 8, is a baffle plate or deflector 14 which is adapted to be turned in either direction by means of the rockershaft so that when moved to one extreme, as shown in Figs. 3 and 4, it will close the passage from the mouth of the funnel to the branch passage 7 and will leave open the passage through the branch 8, and when moved to the other extreme, as shown in dotted lines in Fig. 2, it will close the passage 8 and open the passage 7.

The rockershaft 35 is journaled in suitable bearings in the frame, as, for instance, in bearings 36, 37, and has fixedly mounted thereon an arm 38 which is pivotally connected by a connecting rod 39 with a lever 40 which is actuated at regular intervals of time by mechanism to be described to throw the deflector 14 alternately in opposite directions.

The lever 40 is fulcrumed on shaft 141 and has secured on opposite sides of said lever the spring arms 41, 42, which are adapted to be alternately engaged by a cam 43 mounted loosely on shaft 44 to turn the lever 40 on its fulcrum and move the deflector plate 14.

Cam 43 has an intermitting movement and the cam shaft 44 has a continuous movement as will be described. The mechanism shown for driving the cam shaft is as follows: Mounted fast on the said shaft 44 is a sprocket 45 (see Fig. 6) which is connected by a chain 46 (see Figs. 1 and 2) with a sprocket 47 which is loose on shaft 48, a sprocket 471 also loose on said shaft 48 being connected by a chain 49 with a sprocket 50 on driving shaft 25. The sprockets 47 and 471 are connected together so as to move as one, preferably being made integral with each other.

Mounted fast on shaft 44 is a ratchet 51 with which a pawl 52 pivoted to the face of cam 43 is adapted to engage and when thus engaged the cam 43 will revolve. A spring 53 is adapted to normally hold the pawl 52 in engagement with the ratchet. When the pawl is engaged with the ratchet, the tail of the pawl projects slightly beyond the periphery of the cam, as shown in Fig. 3, and is then in position to be engaged by the hook end of one of the spring arms 41 or 42 on the deflector lever when the cam has revolved far enough to bring the tail of the pawl into the position for such engagement as shown in Figs. 1 and 4, the deflector lever being locked in the proper position for such engagement of the spring arm.

One or the other of the spring arms 41, 42, is in position for one of the hook ends 411 or 412 to be engaged by the cam 43 according to whichever of the two extreme positions the deflector lever occupies, one extreme being shown in Fig. 2 and the other in Fig. 4. When the lever is in the extreme position shown in Fig. 2, the spring carrying end of the lever being turned up, the lower spring 41 has been engaged by the cam and flexed. When the lever is turned to the other extreme, as in Figs. 3 and 4, the other spring arm 42 has been engaged by the cam. If the lever 40 is locked in the position shown in Fig. 2, while the cam rides over the hook end of spring 41, the spring will be flexed and made tense because the lever 40 can not turn on its fulcrum. Projecting from the deflector lever 40 are arms 401 and 402 carrying respectively stop pins 403 and 404 which limit the flexing of the spring arms 41 and 42. The hook ends 411 and 412 are wide enough to engage the periphery of the cam and also the outer end of the pawl. The outward thrust of the spring arms being limited by the stops, the hook ends of the springs when engaged by the tail of the pawl will disengage the pawl from the ratchet.

The pawl 52 is pivoted on the cam in such position that the tail of the pawl projects on the high point of the cam so that the pawl will not be engaged by the end of the spring 41 or the spring 42 as the case may be until the cam has moved far enough around for the high point of the cam to be in engagement with the spring whereby the spring is flexed to its full extent as shown in Fig. 2, and then if the latch is released from the other end of the lever, the lever will respond to the pressure of the spring and turn the lever quickly on its fulcrum into the position shown in Figs. 3 and 4. If, however, the latch is not released from the lever, the lever can not respond to the tension of the spring.

As already stated, a detent mechanism is provided which in the form shown is a latch lever 153 fulcrumed at 54 and having a hook latch 55 which alternately engages the notches 56 and 57 on opposite corners of the head of the deflector lever 40 to lock the deflector lever in one or the other of the two extreme positions of its movement and it remains held in such position until the detent is tripped or released. Means are provided for tripping the latch at regular intervals of time independent of the period of rotation of the cam 43 although the speed of the shaft 44 on which the cam 43 is mounted should be sufficiently great to rotate the cam through a half revolution and thereby flex one or the other of the two springs 41, 42, as the case may be to bring it to a tension to turn the deflector lever 40 as soon as the latch shall be released.

As already stated, sprockets 47 and 471 are loose on shaft 48. A friction device is provided by which the shaft 48 may be made to turn with the sprockets 47 and 471 when the shaft is free to turn with the sprockets but which permits the sprockets to be turned on the shaft 48 when the shaft 48 is positively held against turning. Shaft 48 is journaled in bearings at each end thereof in the frame, one end being journaled in an adjustable screw bearing 61 in the bracket 3 and the other end being journaled in the upright portion 62 of the frame. As shown in the drawings, the friction device consists of two washers 58 and 581 between which the sprockets 47 and 471 are clamped by the spring 59, the washer 581 having secured thereto a hub 60 which is pinned to the shaft 48 so that when the shaft 48 is not locked against rotation by the escape wheel the rotary motion of the sprockets will be communicated to the shaft 48.

Mounted on the shaft 48 is an escape wheel 63 provided with pins 64 projecting from the side thereof and which are adapted to engage the tail of the latch lever 153 to turn the said lever on its fulcrum 54 and disengage the hook 55 from the notch 56 or 57 as the case may be, thereby permitting the deflector lever 40 to respond to the pull of the spring arm 41 or 42. The movement of the escapement, however, is intermitting, being controlled by a balance wheel 65, spring 66, escapement lever 67 and pin disk 68. The escape wheel 63 is fast on shaft 48 so as to move with the said shaft.

The escape wheel 63 is provided with teeth 69 double in number of the pins 64. In the drawings there are four pins and eight teeth 69, but the exact number is not material. The escapement lever 67 is fulcrumed at 70 and is provided with an open slot 71 in its upper end which is engaged by the pin 72 projecting from one side of the pin disk 68. The lower end of the escapement lever 67 is forked, having two pallet arms 73 and 74, the arm 74 being formed with an inclined face 75 which is engaged by one of the teeth 69 of the escape wheel as shown in Fig. 1. The escape lever 67 prevents rotation of the escape wheel until the escape lever has begun its movement by the action of the balance wheel and spring. When the escapement lever is thus moved sufficient to permit the engagement of the point of the tooth of the escape wheel with the inclined face of the pallet 74 the escape wheel will move and impart an impulse to the balance wheel in addition to the impulse given by the balance spring 66. The recoil of the spring 66 aided by the impulse of a tooth of the escape wheel upon the other pallet of the escape lever will impel the escape lever in the reverse direction, thus maintaining the oscillation of the balance wheel.

The intermittent movement of the escape wheel brings the pins 64 successively into engagement with the tail of the latch lever and trips the hook of the latch from the notch 56 or 57 as the case may be and allows the deflector lever to be turned by the flexed spring.

After the latch lever has been tripped, it will at once be pulled back by spring 531 so as to engage with the opposite notch of the deflector lever, one end of said spring being attached to the latch lever and the other end being attached to a fixed support.

The number and disposal of the pins 64 which are adapted to trip the latch lever bear such relation to the teeth on the escapement as to permit one or more oscillations as desired of the balance wheel for each tripping of the latch lever to allow a longer or shorter period of feed before the deflector is shifted. The arrangement of the pins and teeth are definitely fixed so as to provide a uniform period of feed each time.

The upper end of the escapement lever is formed with two opposite arms 76 and 77 which alternately engage the arbor 78 of the pin disk in the opposite strokes of the escapement lever to limit the range of movement. The balance spring 66, therefore, controls the movement of the escapement lever 67 and thereby controls the movement of the escape wheel 63 which in turn controls the latch lever 53 and the lever 40 which moves the deflector plate.

Whatever the speed of the driving shaft 25, the deflector plate cannot be shifted any more rapidly than is permitted by the spring 66. The driving shaft, however, should be speeded up sufficiently so that it will be sure to rotate the cam 43 with sufficient speed so that the spring arms 41, 42, attached to the deflector lever will be flexed in ample time to turn the deflector lever when the latch lever is released.

Means are provided by which the tension of the balance spring 66 may be regulated, and thereby to increase or diminish the speed of action. Any suitable means may be provided, one means being that shown in Fig. 7 in which a lever 81 is shown mounted upon the arbor 78 of the balance wheel having two pins 82, 83, projecting therefrom which extend one on either side of the spring 66 engaging therewith and by turning the lever 81 to the right or left, the tension of the spring may be varied, and thereby increase or diminish the period of oscillation of the balance wheel.

Means are provided by which the material in the receptacle may be settled during the filling operation. The means shown consist of tappers by which the receptacles are given a continuous tapping. The particular mechanism shown is as follows: Fulcrumed on a pivot 90 mounted in a bracket 91 on the under side of the base 13 of the machine is a lever 92 having at its end an upwardly projecting hammer 93 which when the lever is rocked on its fulcrum reciprocates up and down through a slot 941 in the base of the machine beneath the receptacle 9 and is adapted to rap the bottom of the receptacle. A rocking lever 94 is fulcrumed on a pivot 95 mounted in a bracket 96 projecting from the bottom of the base 13 having at its end an upwardly projecting hammer 97 which, when the lever is rocked on its fulcrum, moves up and down through the slot 98 in the base and raps the bottom of the receptacle 10.

Mounted on a rotary shaft 99 is a ratchet 100 whose teeth are adapted to engage a pin 101 projecting laterally from the rocking lever 92. The inner end of the lever 94 is bifurcated, having arms 102 which straddle the inner end of the rocking lever 92 and rest upon the pin 101 so that the rotation of the ratchet 100 will simultaneously actuate both rocking levers 92 and 94 causing a continuous tapping of the receptacles 9 and 10 on the under side.

The shifting of the deflector plate may be timed so that it will be shifted one or more times as desired during the filling of each receptacle. It will sometimes be advantageous to have more than one period of feeding to the receptacle before it is filled so that the material may be more completely settled; that is, the tapping will continue not only during the time that the material is being supplied to the receptacle 9 but also after the feed has been shifted to the receptacle 10 so that the tapping will continue both during the feeding and during the intervals between the feeding.

The operation of the machine will be readily understood from the description already given without detailed repetition of the movements. By regulating the spring 66 to the tension desired and by running the driving shaft with sufficient speed so that the cam 43 will rotate with sufficient speed to flex the springs 41, 42, in ample season, the deflector plate will be shifted at regular intervals of time, and the adjustment may be made to make these intervals any duration desired. By adjusting the stirrer in the hopper, so as to regulate the clearance space through which the material can flow and by adjusting the tension of the spring 66 and speed of the driving shaft, the quantity of material which will pass through the feed funnel at each interval may be very accurately regulated.

I claim as my invention:

1. In a package filling machine, a funnel having two separate outlet passages through which the material may be fed to receptacles in different positions, means for supplying material to said funnel, a movable deflector adapted to divert the flow from either one of said passages and direct it to the other passage in the funnel, a lever connected with said deflector and adapted to actuate said deflector alternately from one position to the other, mechanism which actuates said lever to rock it on its fulcrum, a detent which engages said lever at the end of each stroke to prevent the lever from yielding to its actuating mechanism and time mechanism which releases said detent at regular intervals of time.

2. In a package filling machine, a funnel having two separate outlet passages through which the material may be fed to receptacles in different positions, means for supplying material to said funnel, a movable deflector adapted to divert the flow from either one of said passages and direct it to the other passage in the funnel, a lever connected with said deflector and adapted to actuate said deflector alternately from one position to the other, mechanism which actuates said lever to rock it on its fulcrum, a detent which engages said lever at the end of each stroke to prevent the lever from yielding to its actuating mechanism and an escapement which releases said detent at regular intervals of time.

3. In a package filling machine, a funnel having two separate outlet passages through which the material may be fed to receptacles in different positions, means for supplying material to said funnel, a movable deflector adapted to divert the flow from either one of said passages and direct it to the other passage in the funnel, a lever connected with said deflector and adapted to actuate said deflector alternately from one position to the other, mechanism which actuates said lever to rock it on its fulcrum, a detent which engages said lever at the end of each stroke to prevent the lever from yielding to its actuating mechanism, an escapement which releases said detent at regular intervals of time, and mechanism which again restores said detent to position to reëngage the deflector lever.

4. In a package filling machine, a funnel having two separate outlet passages through which the material may be fed to receptacles in different positions, means for supplying material to said funnel, a movable deflector adapted to divert the flow from either one of said passages and direct it to the other passage in the funnel, a lever connected with said deflector and adapted to actuate said deflector alternately from one position to the other, a spring tension for said lever, a rotary cam which is adapted to engage said spring to rock the said lever on its fulcrum alternately in opposite directions to actuate said deflector, a detent which locks said lever at the end of each stroke and time mechanism which releases said detent at regular intervals of time.

5. In a package filling machine, a package supplying funnel having two separate outlet passages through which the material may be fed to different receptacles, a movable deflector which is adapted to direct the flow to either one of said passages and cut it off from the other, means for shifting said deflector to alternately close one passage and then the other, a detent which engages said lever after each stroke to restrain it from yielding to its actuating mechanism, a rotary escape wheel which is adapted to release said detent, an escapement lever which is engaged by said escape wheel, a balance wheel and spring and pin disk which together with said escape wheel actuate said escapement lever, said escapement lever also preventing the onward movement of the escape wheel to release the detent until the escape lever is moved under the action of the balance spring.

6. In a package filling machine, a funnel having two separate outlet passages through which the material may be fed to different receptacles, means for supplying material to said funnel, a movable deflector adapted to cut off the flow to either one of said passages and direct it to the other passage in the funnel, a lever connected with said deflector and adapted to actuate said deflector alternately from one position to the other, two spring arms secured to said lever, a rotary cam which is adapted to engage said spring arms and rock said lever on its fulcrum alternately in opposite directions, a detent which locks said lever at the end of each stroke of said lever, said spring being flexed by said cam while the lever is held by said detent, and time mechanism which releases said detent at regular intervals of time, whereby said deflector lever is permitted to respond to the action of the cam and spring arms and turn the deflector.

7. In a package filling machine, a funnel having two separate outlet passages through which the material may be fed to different receptacles, means for supplying material to said funnel, a movable deflector adapted to cut off the flow to either one of said passages and direct it to the other passage in the funnel, a lever connected with said deflector and adapted to actuate said deflector alternately from one position to the other, two spring arms secured to said lever, an intermittently rotating member which is adapted to engage said spring arms thereby tending to rock said lever on its fulcrum alternately in opposite directions, a detent which locks said lever at the end of each stroke, said spring being flexed by said intermittent rotating member while the lever is held by said detent, time mechanism which releases said detent at regular intervals of time, whereby said deflector lever is permitted to respond to the action of the spring arms and turn the deflector, driving mechanism and clutch mechanism between said driving mechanism and said intermittently rotating member which is disengaged at a definite point in the rotation of said intermittent member.

8. In a package filling machine, a funnel having two separate outlet passages through which the material may be fed to receptacles in different positions, means for supplying material to said funnel, a movable deflector adapted to divert the flow from either one of said passages and direct it to the other passage in the funnel, a lever connected with said deflector and adapted to actuate said deflector alternately from one position to the other, a spring to actuate said lever, mechanism which is adapted to engage said spring to intermittently increase the tension thereof to rock the said lever on its fulcrum in opposite directions to actuate said deflector when it is free to turn, a detent which locks said lever at the end of each stroke and temporarily holds the lever while the spring is being flexed and time mechanism which releases said detent at regular intervals of time whereby the deflector lever is free to respond to the action of the spring.

9. In a package filling machine, a funnel having two separate outlet passages through which the material may be fed to different receptacles, means for supplying material to said funnel, a movable deflector adapted to cut off the flow to either one of said passages and direct it to the other passage in the funnel, a lever connected with said deflector and adapted to actuate said deflector alternately from one position to the other, two spring arms secured to said lever, actuating mechanism adapted to engage said spring arms alternately to give tension thereto and tending to rock said lever on its fulcrum alternately in opposite directions, a detent which locks said lever at the end of each stroke of said lever, said spring being flexed by said actuating mechanism while the lever is held by said detent, and time mechanism which releases said detent at regular intervals of time, whereby said deflector lever is permitted to respond to the action of the actuating mechanism and spring arms and turn the deflector.

10. In a package filling machine, a funnel having two separate outlet passages through which the material may be fed to receptacles in different positions, a movable deflector adapted to alternately close one of said outlet passages and open the other, a lever fulcrumed intermediate its ends, one arm of the lever being provided with a flexible connection with the said deflector, mechanism which engages the other arm of said lever to rock it on its fulcrum, a detent which engages one arm of said lever at different points thereof at the end of alternate strokes of the lever to prevent it from yielding to its actuating mechanism, time mechanism which releases said detent at regular intervals of time.

11. In a package filling machine, a funnel having two separate outlet passages through which the material may be fed to receptacles in different positions, a movable deflector adapted to alternately close one of said outlet passages and open the other, a lever fulcrumed intermediate its ends, one arm of the lever being provided with a flexible connection with the said deflector, mechanism which engages the other arm of said lever to rock it on its fulcrum, a detent which engages one arm of said lever at different points thereof at the end of alternate strokes of the lever to prevent it from yielding to its actuating mechanism, time mechanism which releases said detent at regular intervals of time, said lever being provided with two spring arms adapted to be alternately engaged by said actuating mechanism to rock it in opposite directions on its fulcrum, said spring arms being respectively and alternately engaged by said actuating mechanism and put under tension thereby while the lever is restrained by the detent from turning on its fulcrum, the tension of said spring causing a sharp turn of the lever on its fulcrum when the detent is released.

12. In a package filling machine, a two branch package supplying funnel, a movable deflector which is adapted to alternately close said branch passages, a lever connected with said deflector to actuate the same, a detent which locks said deflector lever at the end of each forward and return stroke, time controlled mechanism for releasing said detent at regular intervals of time, mechanism for actuating said deflector lever intermittently with an interval of rest between movements thereof, continuously moving driving mechanism, clutch mechanism between the driving mechanism and the intermittently actuating deflector mechanism, time controlled mechanism which renders the clutch operative at predetermined intervals of time, and mechanism which is thereby actuated to render operative the deflector actuating mechanism.

13. In a package filling machine, a funnel having two separate outlet passages through which the material may be fed into different receptacles, a pivoted deflector adapted to rock on its pivot to alternately close one passage and open the other, a rocking lever mounted on an independent fulcrum from the fulcrum of the deflector, a flexible connection between said lever and said deflector whereby the movement of the lever is adapted to actuate the deflector, mechanism which actuates said lever to rock it on its fulcrum, a detent which engages said lever alternately at different points at the end of each stroke to prevent the lever from yielding to its intermediate mechanism, and time controlled mechanism which releases said detent at regular intervals of time.

14. In a package filling machine, a feed funnel through which the material may be continuously fed into receptacles, a movable deflector which is adapted to alternately divert the stream so that after a period of flow into one receptacle it shall be diverted to flow into another receptacle, deflector actuating mechanism, continuously moving driving mechanism, clutch mechanism between the driving mechanism and the deflector actuating mechanism, and time controlled mechanism which renders the clutch operative at predetermined intervals of time to connect the driving mechanism with the deflector actuating mechanism.

15. In a package filling machine, a feed funnel through which the material may be continuously fed into receptacles, a movable deflector which is adapted to divert the stream to flow alternately in different directions, mechanism for actuating said deflector, a detent which locks said deflector at the end of each forward stroke and each return stroke, time controlled mechanism for releasing said detent at pre-determined intervals of time, continuously moving driving mechanism, clutch mechanism between the driving mechanism and the deflector actuating mechanism and time controlled mechanism which renders the clutch operative at pre-determined intervals of time to connect the driving mechanism with the deflector actuating mechanism.

16. In a package filling machine, a hopper through which material is supplied to the packages, said hopper having downwardly tapering sides, a rotating vertical shaft extending into said hopper, a plurality of blades carried by said shaft projecting outwardly therefrom and inclined with relation to the path of movement of the blades, the outer ends of said blades each describing a circle of the same radius when the shaft rotates, and a plurality of inwardly extending blades attached to the inner sides of the hopper and extending inward nearly to the circular path described by the outer ends of said rotating blades, there being sufficient clearance to allow the rotating blades to move past said fixed blades without interfering therewith.

17. In a package filling machine, a hopper through which material is supplied to the packages, a rotating vertical shaft extending into said hopper, a plurality of blades carried by said shaft projecting outwardly therefrom and inclined with relation to the path of movement of the blades, the outer ends of said blades each describing a circle of the same radius when the shaft rotates, and a plurality of inwardly extending blades attached to the inner sides of the hopper and extending inward substantially to the circular path described by the outer ends of said rotating blades, there being sufficient clearance to allow the rotating blades to move past said fixed blades without interfering therewith.

18. In a package filling machine, a two-branch package supplying funnel, a cut-off which is adapted to alternately open one of said branch passages and close the other, means for actuating said cut-off, a hopper through which material is supplied to said funnel, a rotating vertical shaft extending into said hopper, a plurality of blades carried by said shaft projecting outwardly therefrom and inclined with relation to the path of movement of the blades, the outer ends of said blades each describing a circle of the same radius when the shaft rotates, and a plurality of inwardly extending blades attached to the inner sides of the hopper and extending inward substantially to the circular path described by the outer ends of said rotating blades, there being sufficient clearance to allow the rotating blades to move past said fixed blades without interfering therewith.

19. In a package filling machine, a hopper through which material is supplied to the packages, said hopper having downwardly tapering sides, a rotating vertical shaft extending into said hopper, a plurality of blades carried by said shaft projecting outwardly therefrom, the outer ends of said blades each describing a circle of the same radius when the shaft rotates, and a plurality of inwardly extending blades attached to the inner sides of the hopper and extending inward nearly to the circular path described by the outer ends of said rotating blades, there being sufficient clearance to allow the rotating blades to move past said fixed blades without interfering therewith.

20. In a package filling machine, a feed funnel through which the material may be continuously fed into receptacles, a movable deflector which is adapted to alternately divert the stream so that after a period of flow into one receptacle the stream shall be diverted to flow into another receptacle, spring mechanism for actuating said deflector, a detent which locks said deflector at the end of each forward stroke and each return stroke, mechanism for increasing the tension of said spring mechanism after each forward and each return stroke of the deflector, and time controlled mechanism for releasing said detent at pre-determined intervals of time.

21. In a package filling machine, a feed funnel through which the material may be fed into receptacles, a movable deflector which is adapted to alternately divert the stream so that after a period of flow into one receptacle the stream shall be diverted to flow into another receptacle, mechanism for intermittently actuating said deflector driving mechanism, time controlled mechanism for connecting the driving mechanism with the deflector actuating mechanism and disconnecting the same, a detent which locks said deflector at the end of each forward stroke and each return stroke, and time controlled mechanism for releasing said detent at pre-determined intervals of time independent of the mechanism for connecting the driving mechanism with the deflector actuating mechanism.

22. In a package filling machine, a feed funnel through which the material may be continuously fed into receptacles, a movable deflector which is adapted to intermittently divert the stream so that after a period of flow into one receptacle the stream shall be diverted to flow into another receptacle, mechanism for intermittently actuating said deflector, continuously moving driving mechanism, intermediate time controlled mechanism which connects the driving mechanism with the deflector actuating mechanism to render the latter operative.

23. In a package filling machine, a feed funnel through which the material may be continuously fed into receptacles, a movable deflector which is adapted to alternately divert the stream so that after a period of flow into one receptacle the stream shall be diverted to flow into another receptacle, mechanism for intermittently actuating said deflector, a detent which locks said deflector at the end of each stroke, time controlled mechanism for releasing said detent at pre-determined intervals of time, continuously moving driving mechanism and intermediate time controlled mechanism which connects the driving mechanism with the deflector actuating mechanism to render the latter operative.

In testimony whereof I affix my signature, in presence of two witnesses.

WILLIAM H. DOBLE.

Witnesses:
WILLIAM A. COPELAND,
ALINE TARR.